(12) United States Patent
Knoener et al.

(10) Patent No.: US 10,369,650 B2
(45) Date of Patent: Aug. 6, 2019

(54) WELDING PARAMETER SELECTION AND NOTIFICATION SYSTEMS AND METHODS

(71) Applicant: Illinois Tool Works Inc., Glenview, IL (US)

(72) Inventors: Craig Steven Knoener, Appleton, WI (US); Benjamin David Romenesko, Hortonville, WI (US); Ronald Dewayne Woodward, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 462 days.

(21) Appl. No.: 15/058,971

(22) Filed: Mar. 2, 2016

(65) Prior Publication Data

US 2016/0271717 A1    Sep. 22, 2016

Related U.S. Application Data

(60) Provisional application No. 62/133,816, filed on Mar. 16, 2015.

(51) Int. Cl.
*B23K 10/00* (2006.01)
*B23K 9/095* (2006.01)
*B23K 9/12* (2006.01)

(52) U.S. Cl.
CPC ............ *B23K 9/0953* (2013.01); *B23K 9/125* (2013.01)

(58) Field of Classification Search
CPC ...... B23K 9/0953; B23K 9/095; B23K 9/125; B23K 9/124; B23K 10/006; B23K 10/02; H05H 1/36; H05H 1/26
(Continued)

(56) References Cited

U.S. PATENT DOCUMENTS 2,424,324 A    7/1947 Murcek
3,125,671 A    3/1964 Manz
(Continued)

FOREIGN PATENT DOCUMENTS

CN    1539588    10/2004
CN    103071891    5/2013
(Continued)

OTHER PUBLICATIONS

International Search Report & Written Opinion of PCT/US2012/030451 dated Jul. 11, 2012.
(Continued)

*Primary Examiner* — Mark H Paschall
(74) *Attorney, Agent, or Firm* — McAndrews, Held & Malloy, Ltd.

(57) ABSTRACT

A welding system includes an interface having a first input element configured to receive an input relating to a parameter of power delivered to a welding torch from a welding power supply and to alternatively receive an input relating to a thickness of a work piece, a second input element configured to receive an input relating to a rate of advancement of an electrode delivered to the welding torch from a welding wire feeder and to alternatively receive an input relating to a diameter of the electrode, and a third input element configured to receive an input relating to a welding process type. The welding system also includes control circuitry configured to automatically adjust the parameter of the power and the rate of advancement of the electrode based on the input relating to the welding process type selected with the third input element when the second input element receives the input relating to the diameter of the electrode.

24 Claims, 2 Drawing Sheets

Figure 1:
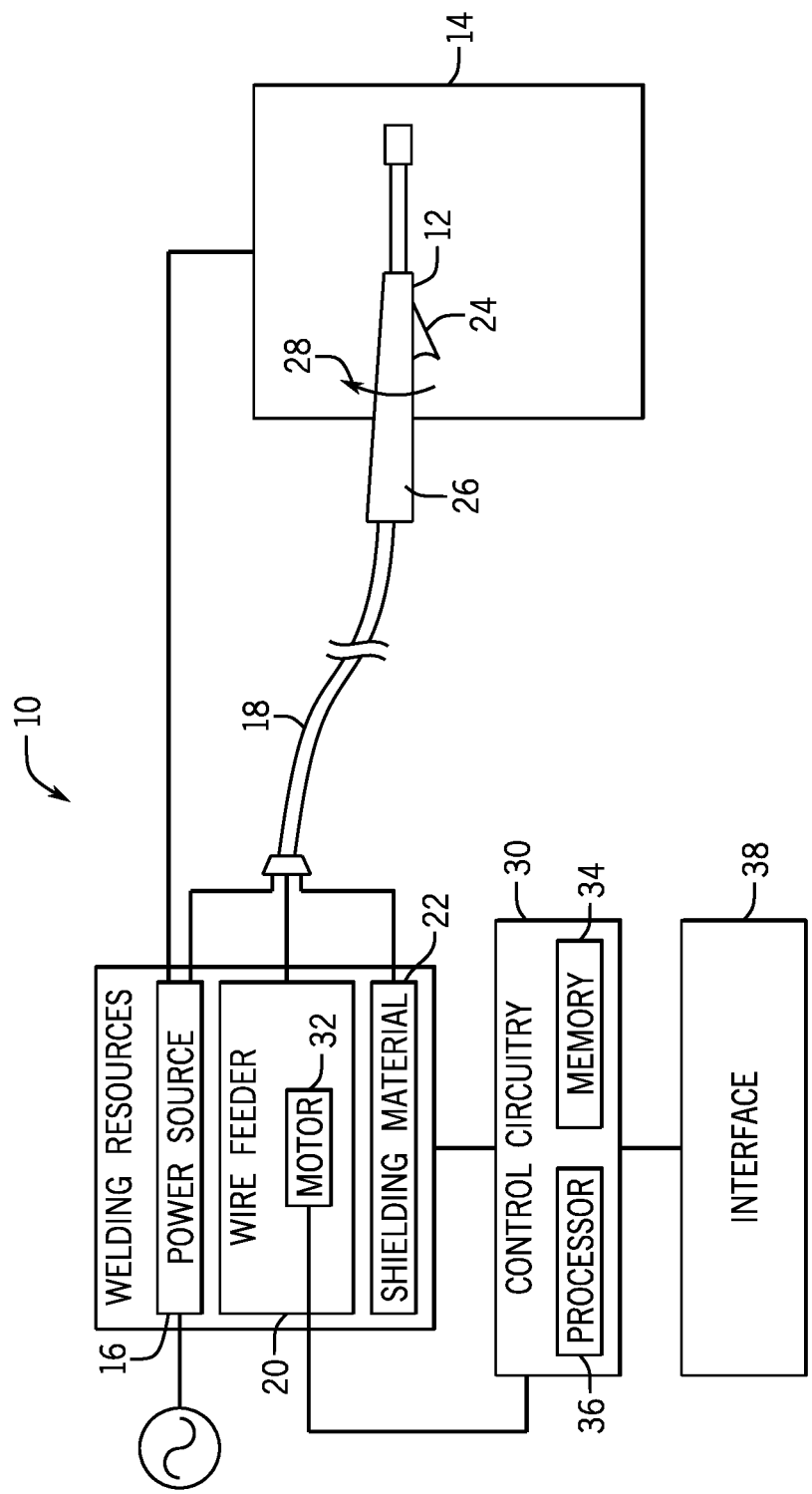

(58) Field of Classification Search
USPC ...... 219/121.45, 76.15, 76.16, 137 R, 137.2, 219/137.7
See application file for complete search history.

(56) References Cited

U.S. PATENT DOCUMENTS

| | | | |
|---|---|---|---|
| 3,555,239 A | 1/1971 | Kerth | |
| 3,924,094 A | 12/1975 | Hansen | |
| 4,093,844 A | 6/1978 | Fellure | |
| 4,438,317 A | 3/1984 | Ueguri | |
| 4,510,373 A | 4/1985 | Cox | |
| 4,608,482 A | 8/1986 | Cox | |
| 4,721,947 A | 1/1988 | Brown | |
| 4,973,821 A * | 11/1990 | Martin | B23K 9/1062 219/130.51 |
| 5,043,554 A | 8/1991 | Kohsaka | |
| 5,278,390 A | 1/1994 | Blankenship | |
| 5,643,479 A | 7/1997 | Lloyd | |
| 6,091,048 A | 7/2000 | Lanouette | |
| 6,166,350 A | 12/2000 | Sickels | |
| 6,167,328 A | 12/2000 | Takaoka | |
| 6,476,354 B1 | 11/2002 | Jank | |
| 6,649,870 B1 | 11/2003 | Barton | |
| 6,735,540 B2 | 5/2004 | Pedrazzini | |
| 6,744,011 B1 | 6/2004 | Hu | |
| 6,930,280 B2 | 8/2005 | Zauner | |
| 8,546,728 B2 | 10/2013 | Sickels | |
| 8,604,389 B2 | 12/2013 | Stanzel | |
| 8,766,132 B2 | 7/2014 | Blankenship | |
| 8,952,292 B2 * | 2/2015 | Behmlander | B23K 9/042 219/121.11 |
| 9,802,265 B2 | 10/2017 | Sickels | |
| 2001/0047987 A1 | 12/2001 | Nowak | |
| 2004/0004064 A1 | 1/2004 | Lanouette | |
| 2004/0020911 A1 | 2/2004 | Centner | |
| 2004/0095704 A1 | 5/2004 | Cigelske | |
| 2004/0099648 A1 | 5/2004 | Hu | |
| 2004/0129759 A1 | 7/2004 | Rouault | |
| 2004/0173591 A1 | 9/2004 | Knoener | |
| 2004/0226930 A1 | 11/2004 | Radtke | |
| 2005/0000946 A1 | 1/2005 | Albrecht | |
| 2005/0016979 A1 | 1/2005 | Stein | |
| 2005/0045608 A1 | 3/2005 | Sykes | |
| 2005/0045611 A1 * | 3/2005 | Ihde | B23K 9/124 219/137.71 |
| 2005/0161448 A1 | 7/2005 | Stava | |
| 2005/0173393 A1 | 8/2005 | Nowak | |
| 2007/0155347 A1 | 7/2007 | Heuermann | |
| 2007/0181553 A1 | 8/2007 | Stanzel | |
| 2008/0203065 A1 | 8/2008 | Feldhausen | |
| 2008/0208387 A1 | 8/2008 | DiVenere | |
| 2009/0071949 A1 | 3/2009 | Harris | |
| 2009/0152251 A1 | 6/2009 | Dantinne | |
| 2009/0173726 A1 | 7/2009 | Davidson | |
| 2009/0277893 A1 | 11/2009 | Speilman | |
| 2010/0314370 A1 | 12/2010 | Granato | |
| 2011/0049116 A1 * | 3/2011 | Rappl | B23K 9/1006 219/132 |
| 2012/0241429 A1 | 9/2012 | Knoener | |
| 2015/0076119 A1 * | 3/2015 | Hsu | B23K 9/0956 219/74 |
| 2017/0036288 A1 * | 2/2017 | Albrecht | B23K 9/0953 |

FOREIGN PATENT DOCUMENTS

| | | |
|---|---|---|
| DE | 4112985 | 10/1992 |
| DE | 9301390 | 4/1993 |
| DE | 19733638 | 2/1999 |
| EP | 0901865 | 3/1999 |
| EP | 0987079 | 3/2000 |
| EP | 2836641 | 9/2003 |
| EP | 1445055 | 8/2004 |
| EP | 1512480 | 3/2005 |
| EP | 1559496 | 8/2005 |
| JP | S5719185 | 2/1982 |
| WO | 2010142858 A1 | 12/2010 |

OTHER PUBLICATIONS

International Search Report from PCT application No. PCT/US2016/018695, dated Jun. 22, 2016, 13 pgs.
International Search Report from PCT application No. PCT/US2016/022064, dated Jun. 29, 2016, 12 pgs.
Canadian Office Action appln. No. 2,830,995 dated Nov. 2, 2017 (4 pages).

* cited by examiner

WELDING PARAMETER SELECTION AND NOTIFICATION SYSTEMS AND METHODS

CROSS-REFERENCE TO RELATED APPLICATIONS

This application claims priority from and the benefit of U.S. Provisional Application Ser. No. 62/133,816, entitled "WELDING PARAMETER SELECTION AND NOTIFICATION SYSTEMS AND METHODS," filed Mar. 16, 2015, which is hereby incorporated by reference in its entirety for all purposes.

BACKGROUND

The present invention generally relates to systems and methods for setting welding parameters.

A common metal welding technique employs the heat generated by electrical arcing to transition a work piece to a molten state, to facilitate a welding process. One technique that employs this arcing principle is wire-feed welding. At its essence, wire-feed welding involves routing welding current from a power source into an electrode that is brought into close proximity with the work piece. When close enough, current arcs from the electrode to the work piece, completing a circuit and generating sufficient heat to weld the work piece. Often, the electrode is consumed and becomes part of the weld itself. Thus, new wire electrode is advanced, replacing the consumed electrode and maintaining the welding arc. If the welding device is properly adjusted, the wire-feed advancement and arcing cycle progresses smoothly, providing a good weld.

Traditionally, during a welding operation, an operator selects the level and types of resources provided to the weld location, depending, of course, on the particulars of the weld and the materials being welded. For instance, an operator may select between various kinds and sizes of wire electrode, ranging from the diameter of wire to the material the wire electrode is made of. Different kinds of wire electrode, however, perform well at different operational settings of the welding device. That is, different kinds of wire electrodes perform well within different voltage range of values and wire-feed speeds, for instance. For example, a given 0.023 inch mild-steel wire electrode may perform well at 17 volts and with a wire-feed speed of 250 inches per minute, while a 0.035 inch mild steel wire electrode performs well at 19 volts with a wire-feed speed of 230 inches per minute.

Conventionally, welding devices rely on the knowledge and acumen of the operator to select the most appropriate voltage and wire feed settings for the wire electrode being used and weld conditions. Unfortunately, in many cases, the weld operator is a novice to the field, especially in the case of portable welding devices. If the operator does not properly adjust the voltage and wire-feed speed settings, the arcing may not be sufficient to produce a good weld, or any weld at all. Furthermore, in traditional devices, the wire-feed speed control and the voltage control are wholly independent from one another, thus making it difficult for the operator to adjust both parameters while a weld is progressing.

BRIEF DESCRIPTION

Systems and methods for setting welding parameters are provided. For example, in one embodiment, a welding system includes an interface having a first input element configured to receive an input relating to a parameter of power delivered to a welding torch from a welding power supply and to alternatively receive an input relating to a thickness of a work piece, a second input element configured to receive an input relating to a rate of advancement of an electrode delivered to the welding torch from a welding wire feeder and to alternatively receive an input relating to a diameter of the electrode, and a third input element configured to receive an input relating to a welding process type. The welding system also includes control circuitry configured to automatically adjust the parameter of the power and the rate of advancement of the electrode based on the input relating to the welding process type selected with the third input element when the second input element receives the input relating to the diameter of the electrode.

In another embodiment, a welding system includes an interface having a first input element configured to receive an input relating to a parameter of power delivered to a welding torch from a welding power supply and to alternatively receive an input relating to a diameter of an electrode delivered to the welding torch from a welding wire feeder, a second input element configured to receive an input relating to a rate of advancement of the electrode and to alternatively receive an input relating to a thickness of a work piece, and a third input element configured to receive an input relating to a welding process type. The welding system also includes control circuitry configured to automatically adjust the parameter of the power and the rate of advancement of the electrode when the first input element receives the input relating to the diameter of the electrode.

In a further embodiment, a method includes adjusting an input relating to a parameter of a power generated by a welding power source with a first input element of a welding system user interface, adjusting an input relating to a rate of advancement of an electrode with a second input element of the welding system user interface, adjusting an input relating to a diameter of the electrode with the second input element, adjusting an input relating to a thickness of a work piece with the first input element after adjusting the input relating to the diameter of the electrode with the second input element, and adjusting an input relating to a welding process type with a third input element of the welding system user interface.

In another embodiment, a method includes displaying a first input element relating to a parameter of a power generated by a welding power source and relating to a thickness of a work piece on a welding system user interface, displaying a second input element relating to a rate of advancement of an electrode and relating to a diameter of the electrode on the welding system user interface, displaying a third input element relating to a welding process type on the welding system user interface, controlling the welding system based on an input relating the power generated by the welding power source selected with the first input element when the second input element is used to select a rate of advancement of the electrode, and controlling the welding system based on an input relating to the thickness of the work piece selected with the first input element when the second input element is used to select the diameter of the electrode.

DRAWINGS

Figure 2:
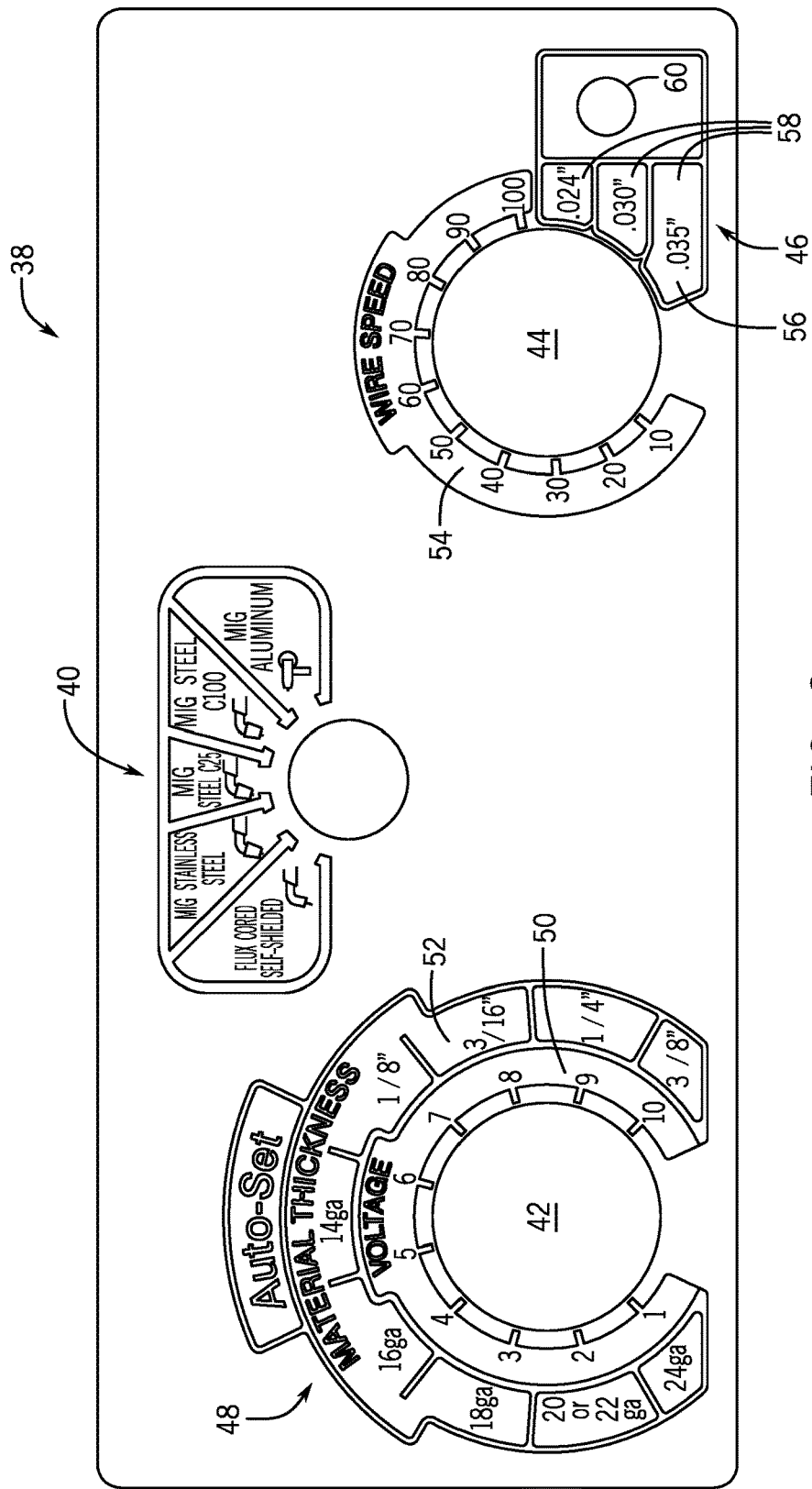

These and other features, aspects, and advantages of the present invention will become better understood when the following detailed description is read with reference to the accompanying drawings in which like characters represent like parts throughout the drawings, wherein:

FIG. 1 is a schematic diagram of an embodiment of a welding system, wherein an interface of the welding system is configured to display welding parameters of the welding system; and FIG. 2 is a front view of an embodiment of the interface including auto-set welding parameters for the welding system of FIG. 1.

DETAILED DESCRIPTION

Turning now to the figures, FIG. 1 illustrates a welding system 10 that includes a welding torch 12 that defines the location of the welding operation with respect to a work piece 14. Placement of the welding torch 12 at a location proximate to the work piece 14 allows electrical current provided by a power source 16 (e.g., welding power supply 16), which converts incoming alternating current (AC) power to an appropriate direct current (DC) power and routes the DC power to the welding torch 12 via a welding torch cable 18, to arc from the welding torch 12 to the work piece 14. In summary, this arcing completes an electrical circuit from the power source 16, to the welding torch 12 via the welding torch cable 18, to a wire electrode, to the work piece 14, and at its conclusion, back to the power source 16. This arcing generates a relatively large amount of heat causing the work piece 14 and/or filler metal to transition to a molten state, facilitating the weld.

To produce electrical arcing, the exemplary welding system 10 includes a wire feeder 20 that provides a consumable wire electrode to the welding torch cable 18 and, in turn, to the welding torch 12. The welding torch 12 conducts electrical current to the wire electrode via a contact tip (not shown) located in a neck assembly of the welding torch 12, leading to arcing between the egressing wire electrode and the work piece 14.

To shield the weld area from contaminants during welding, to enhance arc performance, and to improve the resulting weld, the exemplary welding system 10 includes a gas source 22 that feeds an inert shielding gas to the welding torch 12 via the welding torch cable 18. It is worth noting, however, that a variety of shielding materials, including various fluids and particulate solids, may be employed to protect the weld location. Additionally, certain wire electrodes are designed to operate without a shielding material.

Advancement of these welding resources (e.g., welding current, wire-electrode, and shielding gas) is effectuated by actuation of a trigger 24 secured to a handle 26 of the welding torch 12. By depressing the trigger 24 (arrow 28), a switch disposed within the trigger 24 is closed, causing the transmission of an electrical signal that commands promotion of the welding resources into the welding torch cable 18. For example, depressing the trigger 24 sends a signal to control circuitry 30, which, in turn, activates a motor 32 that advances wire electrode into the welding torch cable 18, opens a valve to allow the flow of shielding material, and commands the power source 16 to output the desired level of power to the wire electrode. In certain embodiments, the control circuitry 30 includes memory components 34, to store programming instructions, command programs, appropriate data, etc. The control circuitry 30 also includes a processing device, such as a processor 36, among others types of devices, to effectuate control of the welding system 10.

To adjust operating parameters of the welding system 10, a user interface 38 may be included as part of the system 10. The user interface 38 is the means by which a user or an operator interacts with the welding system 10. The user interface 38 may include input devices such as pushbuttons, dials, touch screens, scroll wheels, switches, knobs, sliders, or any form of transducer that converts a physical interaction with the user interface 38 into an electrical signal input. As will be discussed henceforth and illustrated by FIG. 2, in certain embodiments, the user interface 38 may include a welding process selector 40 (e.g., input device or input element), a voltage adjustment dial 42 (e.g., input device or input element), and a wire feed speed adjustment dial 44 (e.g., input device or input element). Although described herein as being a voltage adjustment dial 42, in other embodiments, the voltage adjustment dial 42 may instead be a dial configured to adjust amperage or other parameter of the welding power delivered by the power source 16. While the welding process selector 40, the voltage adjustment dial 42, and the wire feed speed adjustment dial 44 are shown as rotatable dials in the illustrated embodiment, other embodiments may include other input devices or elements for these components. For example, the welding process selector 40, the voltage adjustment dial 42, and the wire feed speed adjustment dial 44 may be pushbuttons, touch screens, sliders, scroll wheels, switches, knobs, liquid crystal displays, or any other suitable input device or element configured to enable operator interaction with the user interface 38 for adjusting one or more operating parameters of the welding system 10.

As discussed in detail below, the voltage adjustment dial 42 and the wire feed speed adjustment dial 44 may both have dual functionalities. For example, in certain circumstances, the wire feed speed adjustment dial 44 may also function as an electrode diameter adjustor 46, and the voltage adjustment dial 42 may also function as a material thickness adjustor 48 (e.g., to adjust the setting corresponding to the material thickness of the work piece 14). It should be noted that while the illustrated embodiment includes a voltage adjustment dial 42, in other embodiments, a dial configured to set some other parameter of power (e.g., current) may be used.

With the foregoing in mind, the welding process selector 40 may allow an operator or other user to select from a plurality of welding processes. For example, as depicted in FIG. 2, the welding process selector 40 may allow an operator to choose from welding processes, such as a flux cored welding process, a metal inert gas (MIG) welding process, and so forth. Although not shown in FIG. 2, the welding process selector 40 may also include other welding processes, such as a tungsten inert gas (TIG) welding process, a stick welding process, and so forth. In addition to general welding processes, in certain embodiments, the welding process selector 40 may also allow the operator to select the material of the welding electrode. For example, as depicted in FIG. 2, in desiring to implement a MIG welding process, the operator may further select, for example, a stainless steel, another type of steel, or aluminum electrode for implementing the MIG process. In one embodiment, the welding process selector 40 may also allow an operator to select a desired welding process (e.g., flux-cored, MIG, etc.), electrode material type (e.g., steel, aluminum, etc.), and gas type (e.g., C25, C100, Argon, etc.), and subsequently elect to enable the auto-set function of the welding system 10 to automatically set the appropriate voltage and wire-feed speed and/or amperage welding parameters. The auto-set functionality is described in greater detail in U.S. Patent Application Publication Number 2007/0181553, which is herein incorporated by reference in its entirety.

As previously discussed, the user interface 38 may also include the voltage adjustment dial 42 (e.g., input device or element) and the wire feed speed adjustment dial 44 (e.g., input device or element), each of which may have dual functionalities. To this end, each of the voltage adjustment dial 42 and the wire feed speed adjustment dial 44 includes a first parameter indicator and a second parameter indicator. That is, the voltage adjustment dial 42 has a first parameter indicator 50 indicative of a voltage selection (e.g., 1, 2, 3, 4, 5, 6, 7, 8, 9, and 10 in the illustrated embodiment) and a second parameter indicator 52 indicative of a material thickness selection (e.g., 24 gauge, 20/22 gauge, 18 gauge, 16 gauge, 14 gauge, 1/8", 3/16", 1/4", and 3/8" in the illustrated embodiment). Similarly, the wire feed speed adjustment dial 44 has a first parameter indicator 54 indicative of a wire feed speed selection (e.g., 10, 20, 30, 40, 50, 60, 70, 80, 90, and 100 in the illustrated embodiment) and a second parameter indicator 56 indicative of an electrode diameter selection (e.g., 0.024", 0.030", and 0.035" in the illustrated embodiment).

In certain embodiments, the various parameters adjusted by the voltage adjustment dial 42 and the wire feed speed adjustment dial 44 may vary. For example, in certain embodiments, with the voltage adjustment dial 42, the second parameter indicator 52 may be indicative of an electrode diameter selection (as opposed to being indicative of a material thickness selection), and with the wire feed speed adjustment dial 44, the second parameter indicator 56 may be indicative of a material thickness selection (as opposed to being indicative of an electrode diameter selection). In such an embodiment, the settings 58 relating to the second parameter indicator 56 may be discrete settings relating to material thickness (as opposed to electrode diameter).

It should be noted that only one of the first parameter indicator and the second parameter indicator for each of the voltage adjustment dial 42 and the wire feed speed adjustment dial 44 may be used at one time. For example, at a given time, the position of the voltage adjustment dial 42 may correspond to a setting of either the first parameter indicator 50 indicative of a voltage selection or the second parameter indicator 52 indicative of a material thickness selection. Similarly, at a given time, the position of the wire feed speed adjustment dial 44 may correspond to a setting of either the first parameter indicator 54 indicative of a wire feed speed selection or the second parameter indicator 56 indicative of an electrode diameter selection. The utility of each of the first and second parameter indicators is described in further detail below.

As the voltage adjustment dial 42 and the wire feed speed adjustment dial 44 each has dual functionality, the welding system 10 may have different operation settings. For example, in one operation setting, a user may select a welding process with the welding process selector 40, the user may use the voltage adjustment dial 42 to select a desired voltage output for the welding system 10, indicated by the first parameter indicator 50, and the user may use the wire feed speed adjustment dial 44 to select a desired wire feed speed, indicated by the first parameter indicator 54.

In another operation setting, the user may rotate the wire feed speed adjustment dial 44 to select a desired electrode diameter indicated by the second parameter indicator 56, thereby changing the operation setting of the welding system 10. In the illustrated embodiment, the second parameter indicator 56 includes three settings 58, each of which is indicative of a different desired electrode diameter. Each setting 58 of the second parameter indicator 56 may also have a corresponding discrete detent, thereby enabling mechanical arrest of the wire feed speed adjustment dial 44 when one of the settings 58 is selected.

When the wire feed speed adjustment dial 44 is used to select one of the settings 58 of a desired electrode diameter, the welding system 10 may enter an auto-set mode. When the auto-set mode is enabled, the operator may use the voltage adjustment dial 42 to select a desired material thickness setting, as indicated by the second parameter indicator 52. In other words, when the welding system 10 is in the auto-set mode (due to a selection of one of the settings 58 by the wire feed speed adjustment dial 44), the voltage adjustment dial 42 is not used to select a desired output voltage, as indicated by the first parameter indicator 50, but rather to select a desired material thickness, as indicated by the second parameter indicator 52. Additionally, when the welding system 10 is in auto-set mode, the power source 16 may automatically adjust (e.g., increase or decrease) wire feed speed, voltage, and/or amperage parameters to appropriate settings based on the electrode diameter selected by the wire feed speed adjustment dial 44, the material thickness selected by the voltage adjustment dial 42, and/or the welding process selected with the welding process selector 40. In certain embodiments, the user interface 38 may also include a light graphical indicator 60 (e.g., light emitting diode (LED)) to indicate whether the auto-set mode is enabled or disabled. Thus, when the wire feed speed adjustment dial 44 is used to select one of the settings 58 of the second parameter indicator 56, the light graphical indicator 60 may be illuminated to indicate that the auto-set mode is enabled. Conversely, when the wire feed speed adjustment dial 44 is used to select a desired wire feed speed indicated by the first parameter indicator 54, the light graphical indicator 60 may not be illuminated.

In certain applications, it may be possible to select a combination of settings (e.g., using the welding process selector 40, the voltage adjustment dial 42, and/or the wire feed speed adjustment dial 44) that are not workable or feasible for the welding system 10. For example, when the welding system 10 is coupled to different sources of power (e.g., 120V, 240V, etc.), the welding system 10 may have different capabilities based on the selected settings (e.g., welding process, voltage (or amperage or power), wire feed speed, material thickness, electrode diameter, and so forth). For example, if the welding system 10 is first powered by a 240V source of power and subsequently powered by a 120V source of power, the welding system 10 may not be able to properly function in certain combinations of settings. When the welding system 10 is configured with a combination of settings that are not feasible or workable, the welding system 10 (e.g., the control circuitry 30 and/or the auto-set function of the welding system 10) may automatically adjust the settings of the welding system 10 to a "best available" setting combination (e.g., to a setting combination as close as possible to the desired setting combination). For example, the control circuitry 30 and/or the auto-set function may automatically adjust one or more of the welding process, voltage (or amperage or power), wire feed speed, material thickness, electrode diameter, or other operating parameter to enable workable, feasible operation of the welding system 10. In certain applications, the automatic adjustment (e.g., the one or more settings that are automatically adjusted by the auto-set function or control circuitry 30) may be based on a "best mode" or "best available mode" determined by an algorithm or other programmable logic of the control circuitry 30 (e.g., stored in the memory 34 of the control circuitry 30 and executable by the processor 32 of the control circuitry 30).

Furthermore, in certain applications where the auto-set function and/or control circuitry 30 automatically adjusts one or more settings when a combination of selected settings is not feasible, the light graphical indicator 60 of the user interface 38 may be configured to provide an indication that one or more settings has been automatically adjusted. For example, the control circuitry 30 may cause the light graphical indicator 60 to blink or flash when one or more settings is automatically adjusted. Further, in certain embodiments, the blinking or flashing pattern of the light graphical indicator 60 and/or a color of the light graphical indicator 60 may vary based on the particular setting that has been automatically adjusted. The user interface 38 may also or alternatively include a display (e.g., LCD) that provides an indication of an automatic adjustment of one or more settings based on an unworkable combination of selected settings.

Although described herein as having the welding process selector 40, the voltage adjustment dial 42, the wire feed speed adjustment dial 44, the electrode diameter adjustor 46, and the material thickness adjustor 48 as physical inputs devices, in other embodiments, the user interface 38 may include a display screen capable of displaying visual graphical objects and/or alphanumeric texts relating to the setting of welding parameters, real-time operational statuses of the welding system 10, and so forth. In certain embodiments, the welding process selector 40, the voltage adjustment dial 42, the wire feed speed adjustment dial 44, the electrode diameter adjustor 46, the material thickness adjustor 48, or any combination thereof, may be displayed as graphical input devices on the display screen. For example, in certain embodiments, the display screen may be a touch screen configured to receive inputs from a user via such graphical input devices that are displayed on the display screen. In other words, instead of (or in addition to) actual physical input devices disposed on the user interface 38, in certain embodiments, other types of user input elements, such as graphical buttons, sliders, knobs, and so forth, displayed via the display screen may be used to receive inputs from a user. As such, the user interface 38 may include various types of input elements, including both physical inputs devices as well as graphical input elements. In addition, in certain embodiments, the parameter indicators 50, 52, 54, 56, the light graphical indicator 60, or any combination thereof, may be displayed as graphical elements on the display screen.

For example, in an embodiment where the user interface 38 is a touch screen or display that displays the welding process selector 40, the voltage adjustment dial 42, the material thickness adjustor 44, the electrode diameter adjustor 46, and/or the material thickness adjustor 48, the user interface 38 may also change the display or highlight a graphical element (e.g., parameter indicator) on the display based on a user input. In such an embodiment, the user interface 38 may display the voltage adjustment dial 42 (e.g., graphical input device) with the material thickness adjustor 48, as shown in FIG. 2. The display may also display the wire feed speed adjustment dial 44 (e.g., graphical input device) with the electrode diameter adjustor 46 together, as shown in FIG. 2. If an operator uses the user interface 38 (e.g., touch screen) to select a wire feed speed with the wire feed speed adjustment dial 44, the user interface 38 may be configured to then display only the voltage adjustment dial 42 and not the material thickness adjustor 44, thereby indicating to the operator that a voltage adjustment may be selected along with the selected wire feed speed. Alternatively, if an operator uses the user interface 38 to select a wire feed speed with the wire feed speed adjustment dial 44, the user interface 38 may be configured to then highlight or change the color of the first parameter indicator 50 and not the second parameter indicator 52 to indicate that the operator may select a voltage adjustment with the selected wire feed speed. The user interface 38 (e.g., graphical display) may make similar adjustments if the wire feed speed adjustment dial 44 (e.g., graphical input device) is used to select an electrode diameter and/or based on a selection of a welding process with the welding process selector 40.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A welding system, comprising:
an interface, comprising:
a first input element configured to receive an input relating to a parameter of power delivered to a welding torch from a welding power supply and to alternatively receive an input relating to a thickness of a work piece;
a second input element configured to receive an input relating to a rate of advancement of an electrode delivered to the welding torch from a welding wire feeder and to alternatively receive an input relating to a diameter of the electrode; and
a third input element configured to receive an input relating to a welding process type; and
control circuitry configured to automatically adjust the parameter of the power and the rate of advancement of the electrode based on the input relating to the welding process type selected with the third input element when the second input element receives the input relating to the diameter of the electrode.

2. The welding system of claim 1, wherein the interface comprises a light graphical indicator configured to illuminate when the second input element receives the input relating to the diameter of the electrode.

3. The welding system of claim 1, wherein the control circuitry is configured to automatically adjust the input relating to the parameter of the power, the input relating to the thickness of the work piece, the input relating to the rate of advancement of the electrode, and/or the input relating to the diameter of the electrode when a combination of the inputs selected by an operator is not feasible for the welding system.

4. The welding system of claim 3, wherein a light graphical indicator of the user interface is configured to flash when the control circuitry automatically adjusts one of the inputs.

5. The welding system of claim 3, wherein a light graphical indicator of the user interface is configured to change color when the control circuitry automatically adjusts one of the inputs.

6. The welding system of claim 1, wherein the control circuitry is configured to automatically adjust the input relating to the parameter of the power, the input relating to the thickness of the work piece, the input relating to the rate of advancement of the electrode, and/or the input relating to the diameter of the electrode based on the input relating to the welding process type.

7. The welding system of claim 1, wherein each of the first, second, and third input elements comprises a pushbutton, a dial, a touch screen, a scroll wheel, a switch, a knob, a slider, or any combination thereof.

8. A welding system, comprising:
an interface, comprising:
a first input element configured to receive an input relating to a parameter of power delivered to a welding torch from a welding power supply and to alternatively receive an input relating to a diameter of an electrode delivered to the welding torch from a welding wire feeder;
a second input element configured to receive an input relating to a rate of advancement of the electrode and to alternatively receive an input relating to a thickness of a work piece; and
a third input element configured to receive an input relating to a welding process type; and
control circuitry configured to automatically adjust the parameter of the power and the rate of advancement of the electrode when the first input element receives the input relating to the diameter of the electrode.

9. The welding system of claim 8, wherein the interface comprises a light graphical indicator configured to illuminate when the first input element receives the input relating to the diameter of the electrode.

10. The welding system of claim 8, wherein the welding process type comprises a flux cored shelf-shielded welding process, a metal inert gas stainless steel welding process, a metal inert gas steel C25 welding process, a metal inert gas steel C100 welding process, a metal inert gas aluminum welding process, or any combination thereof.

11. The welding system of claim 8, wherein a light graphical indicator of the user interface is configured to flash when a selected combination of the first input element, the second input element, and the third input element is incompatible with operation of the welding system.

12. The welding system of claim 8, wherein a light graphical indicator of the user interface is configured illuminate a first color when the first input element receives the input relating to the diameter of the electrode, and the light graphical indicator is configured to illuminate a second color different from the first color when a selected combination of the first input element, the second input element, and the third input element is incompatible with operation of the welding system.

13. The welding system of claim 8, wherein the control circuitry is configured to automatically adjust the input relating to the parameter of the power, the input relating to the thickness of the work piece, the input relating to the rate of advancement of the electrode, and/or the input relating to the diameter of the electrode when a combination of the inputs selected by an operator is not feasible for the welding system based on the input relating to the welding process type.

14. The welding system of claim 13, wherein a light graphical indicator of the user interface is configured to flash when the control circuitry automatically adjusts one of the inputs.

15. A method of operating a welding system, comprising:
adjusting an input relating to a parameter of a power generated by a welding power source with a first input element of a welding system user interface;
adjusting an input relating to a rate of advancement of an electrode with a second input element of the welding system user interface;
adjusting an input relating to a diameter of the electrode with the second input element;
adjusting an input relating to a thickness of a work piece with the first input element after adjusting the input relating to the diameter of the electrode with the second input element; and
adjusting an input relating to a welding process type with a third input element of the welding system user interface.

16. The method of claim 15, comprising illuminating a light graphical indicator of the welding system user interface after adjusting the input relating to the diameter of the electrode with the second input element of the welding system user interface.

17. The method of claim 15, comprising automatically adjusting the input relating to the parameter of the power, the input relating to the thickness of the work piece, the input relating to the rate of advancement of the electrode, and/or the input relating to the diameter of the electrode when a combination of the inputs selected by an operator is not feasible for the welding system.

18. The method of claim 17, comprising changing a color of a light graphical indicator of the user interface when the combination of the inputs selected by the operator is not feasible for the welding system.

19. The method of claim 15, comprising automatically adjusting the parameter of the power and the rate of advancement of the electrode when the second input element receives the input relating to the diameter of the electrode.

20. The method of claim 15, wherein adjusting the input relating to the parameter of the power generated by the welding power source with the first input element of the welding system user interface comprises rotating a first knob to a first position of the first knob, wherein adjusting the input relating to the rate of advancement of the electrode with the second input element of the welding system user interface comprises rotating a second knob to a first position of the second knob, and wherein adjusting the input relating to the diameter of the welding electrode with the second input element comprises rotating the second knob to a second position of the second knob.

21. A method of operating a welding system, comprising:
displaying a first input element relating to a parameter of a power generated by a welding power source and relating to a thickness of a work piece on a welding system user interface;
displaying a second input element relating to a rate of advancement of an electrode and relating to a diameter of the electrode on the welding system user interface;
displaying a third input element relating to a welding process type on the welding system user interface;
controlling the welding system based on an input relating the power generated by the welding power source selected with the first input element when the second input element is used to select a rate of advancement of the electrode; and
controlling the welding system based on an input relating to the thickness of the work piece selected with the first input element when the second input element is used to select the diameter of the electrode.

22. The method of claim 21, comprising automatically adjusting the parameter of the power generated by the welding power source and automatically adjusting the rate of advancement of the electrode based on the welding process type selected with the third input element when the second input element is used to select the diameter of the electrode.

23. The method of claim 21, comprising automatically adjusting the parameter of the power generated by the welding power source and automatically adjusting the rate of advancement of the electrode based on the thickness of the work piece selected with the first input element when the second input element is used to select the diameter of the electrode.

24. The method of claim 21, comprising displaying the first input element, the second input element, and the third input element on one or more touch screens.

* * * * *